J. W. Douglas.
Pump.
Nº 97,767.    Patented Dec. 14, 1869.
Fig: 1.    Fig: 2.
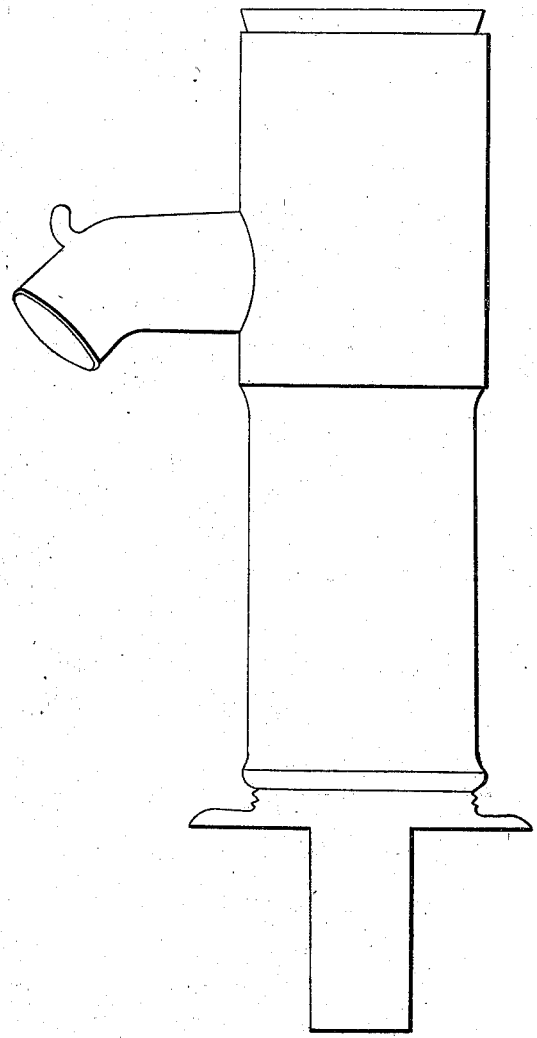
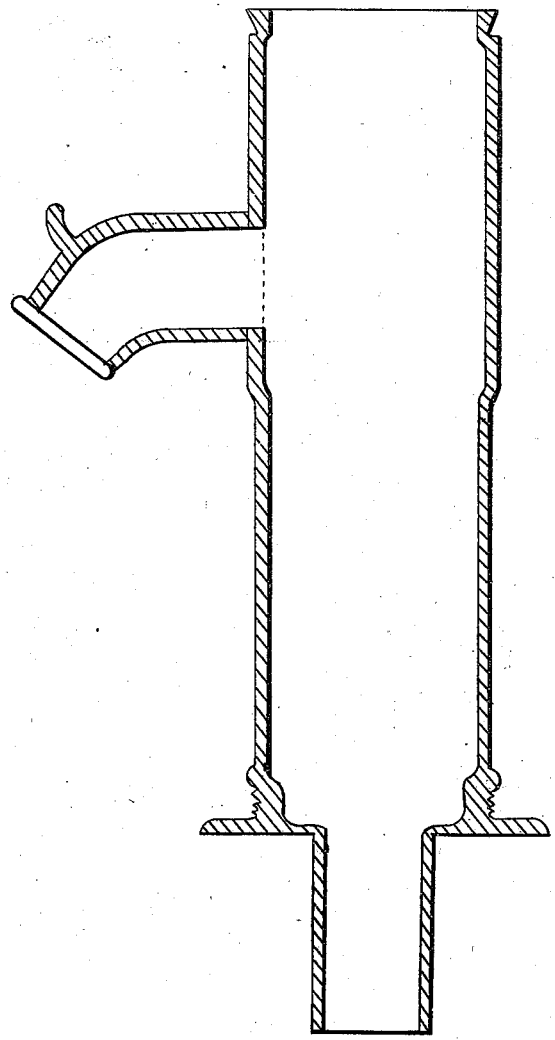
Witnesses;
A. E. Gale
C. A. Grans
Inventor,
J. W. Douglas
Per S. D. Gee Atty

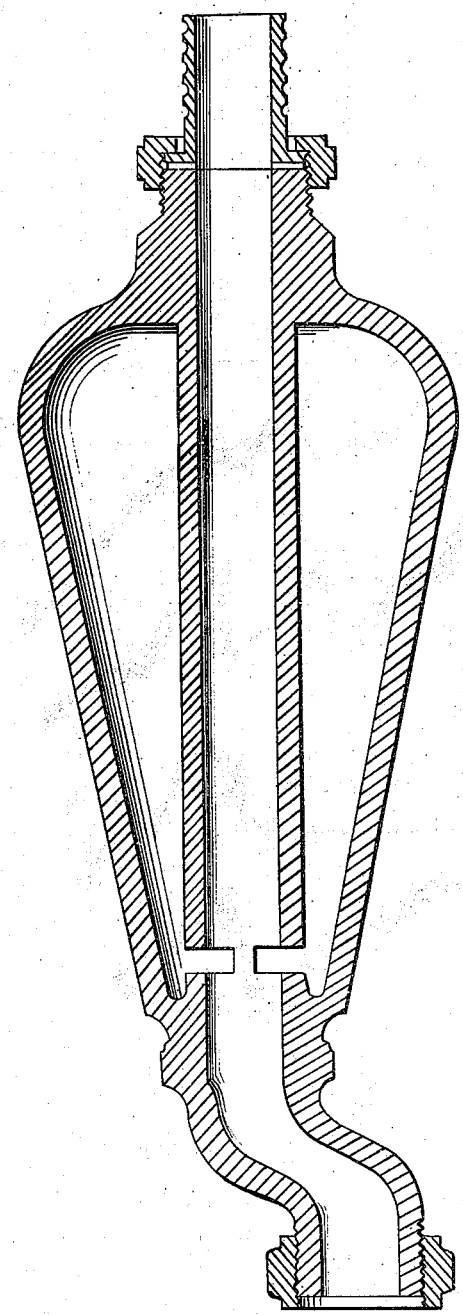

United States Patent Office.

JOSEPH W. DOUGLAS, OF MIDDLETOWN, CONNECTICUT, ASSIGNOR TO W. & B. DOUGLAS.

Letters Patent No. 97,767, dated December 14, 1869.

IMPROVEMENT IN PUMPS.

The Schedule referred to in these Letters Patent and making part of the same.

Be it known that I, JOSEPH W. DOUGLAS, of Middletown, in the county of Middlesex, and State of Connecticut, have invented certain new and useful Devices in the Manufacture of Iron Pumps, Hydraulic Rams, and their equivalents, for pumping water, and designed to prevent the wear and tear of the metal, and injuring the water, and the leather valve and packing, as is now done by pumps in use.

The invention consists in lining the air-chamber and the contiguous passages of pumps and hydraulic rams, and their equivalents, with a lining of porcelain or earthen material, which shall prevent the metal from rusting, and preserve, at the same time, the water from being diffused with particles of iron-rust and colored, and thus deteriorated.

There is another defect in the use of iron pumps, specially applicable to force-pumps and hydraulic rams, and to all hydraulic apparatus where air-chambers are used.

These air-chambers of cast-iron, from the porous condition of the metal, will so leak air, that in a few days the air will escape through the pores of the metal, and fill the chamber with water.

There is still another evil from the use of the naked iron cylinder. It is its effects on the leather valve-piece and packing, which material absorbs into its pores the diffused iron-rust of the water, which hardens the leather until it becomes brittle, tender, and soon requires to be renewed, whereas, in pure water, the leather remains pliable for years.

To counteract and obviate these evils, is the design of the invention described.

The coating of iron is done by first cleaning the metal with sulphuric or muriatic acid, to remove oxide and foreign matter, and then washing with clean water. Then a mixture of fusible earthy matter is ground together and made of a creamy consistence with water, and laid on the surface with a brush, and when dry, the metal and composition are removed to an enameller's oven, and heated till the composition is fused.

The compounds used are various. Pure white sand, borax, felspar, and clay, in equal parts, are a popular compound, and when brushed on and dried, and then covered with a paste of equal parts of carbonate of soda and felspar, and dried, the product is said to be very good.

In the drawings—

Figure 1 is a vertical elevation.

Figure 2, a section through the axis of the cylinder.

I do not claim the enamelling of the inner surface of metal pump-cylinders, along the track of the piston.

I claim an air-chamber, and the passages connected therewith, having a porcelain-enamel surface, as and for the purpose described.

JOS. W. DOUGLAS.

Witnesses:
JNO. M. DOUGLAS,
GEO. M. SMITH.